DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 713

T869,009

DOUBLE HARDENING OF EPOXY RESINS

Lee F. Frank, Kodak Park Works,
Rochester, N.Y. 14650

Filed Apr. 18, 1969, Ser. No. 817,546
Int. Cl. B29c *25/00*
U.S. Cl. 264—236
No Drawing. 9 Pages Specification

Molded articles of epoxy resins readily removable from the most detailed molds can be prepared by mixing 100 parts of the epoxy resin with 10 to 30 parts of a curing agent composition consisting essentially of 30 to 70% by weight of a low temperature curing agent and 70 to 30% by weight of a high temperature curing agent, casting said mixture into a mold, curing said mixture at a temperature below the reaction temperature of the high temperature curing agent to provide a flexible, solid article, removing the article from the mold and curing the article to a rigid solid by heating at the elevated reaction temperature of the high temperature curing agent. A preferred curing agent composition consists essentially of 50% by weight of the low and the high temperature curing agent. The epoxy resins to which the process of the invention pertains comprise glycidyl polyethers of polyhydric aromatic and aliphatic alcohols. Particularly preferred epoxy resins are the reaction products of epichlorohydrin and bis(4-hydroxyphenyl)-2,2-propane. Diethylene triamine, triethylene triamine. triethylene tetramine, Epon Curing Agent U and Epon Curing Agent T–1 are illustrative low temperature curing agents. Diaminodiphenyl sulfone, $BF_3$-monethylaminetrifluoride, diethylaminoethanol, methylenediamine and methylenedianiline are illustrative high temperature curing agents.